United States Patent Office 3,592,788
Patented July 13, 1971

---

3,592,788
EMULSIONS AND THEIR USE IN SOIL TREATMENT
Fritz S. Rostler, Berkeley, Calif., assignor to Phillips Petroleum Company, Bartlesville, Okla.
No Drawing. Filed Dec. 14, 1967, Ser. No. 691,116
Int. Cl. C08f 45/52, 45/44
U.S. Cl. 260—28.5                     4 Claims

ABSTRACT OF THE DISCLOSURE

An emulsion concentrate (1) containing a thermoplastic elastomer of the styrene-butadiene block copolymer type which is soluble in trichlorethylene to give a viscosity of about 800 to 1,000 centipoises at room temperature at a polymer concentration of 15% by weight, and having a modulus at 300% of 200 p.s.i. or higher, a coumarone-indene resin, a polar solvent which is an unsaturated resinous oil that is nonvolatile under atmospheric conditions, a chlorinated hydrocarbon solvent which is volatile under atmospheric conditions, a nonpolar solvent of the aromatic hydrocarbon type which is volatile under atmospheric conditions, a cationic emulsifier and water. An emulsion concentrate (2) containing from about 40 to 60 parts of an asphalt of about 10 to 30 penetration grade; a non-polar solvent of the aromatic hydrocarbon type which is volatile under atmospheric conditions; a chlorinated hydrocarbon solvent which is volatile under atmospheric conditions, a cationic surfactant, and water. Method of treating soils with an aqueous emulsion containing a mixture of concentrates (1) and (2) or consecutively with an emulsion containing concentrate (1) and also with an emulsion containing concentrate (2) or vice versa.

---

Many attempts have been made to consolidate earth surfaces to withstand the erosion effect of winds, rains, and surface waters. The principal difficulties encountered in such attempts have resulted from the wide differences of soils as encountered at various geographical locations. Natural soils vary from coarse-grained sands to heavy clays and every soil type has a particular set of properties which are responsible for shortcomings when it is subjected to traffic and the effect of the elements. For instance, sandy soils of good bearing strength have no cohesiveness as required to resist abrasion and erosion while clay soils of good cohesiveness have insufficient bearing strength when wet.

Soils also differ widely in their permeability. Sandy soils, for instance, are highly water permeable, while clay soils swell in contact with water and then resist permeation.

Previous workers have attempted to impart the desired properties of bearing strength and erosion resistance to soils without resorting to admixing and blending of soil types or to such extensive operations as paving. One approach has been to use a spray-on application to provide a soil having the desired resistance to both traffic flow and to erosion by wind and water. Although partial success has been obtained for spray-on applications, no satisfactory method except paving is known for treating surfaces which are subjected to wheeled traffic and to high air velocities as in the case of unsurfaced areas of airports.

My invention pertains to an emulsion comprising a styrene-butadiene block copolymer, a coumarone-indene resin, a solvent of the aromatic hydrocarbon type, and polar solvents. This emulsion may be sprayed onto soils of various types, thereby converting them into a coherent mass to a depth of penetration which will resist the action of even severe and unusual winds, rains, and surface waters. Such a coherent soil mass is suitable for unsurfaced portions of airports and is capable of supporting random traffic and of resisting erosion from the high air velocities produced by aircraft during landing or take-off. In use, my emulsion concentrate (1) or (2) or a mixture thereof is usually admixed with water prior to application to the soil to be treated.

In accord with my invention, the soil itself is modified and improved to meet the criteria of strength, waterproofing, erosion resistance, etc. My invention does not require the forming of a surface membrane or any such procedure in which the soil itself is not a part of the stabilized system. If desired, however, surface membranes can be formed in use of my process by applying a concentrated emulsion to the soil to be treated, preferably after pretreatment with a diluted emulsion.

My emulsion concentrates (1) or (2) or a mixture thereof may be applied directly to the soil to be treated. In order that emulsion concentrate (2) be fully compatible with emulsion concentrate (1), I have found that it should employ essentially the same volatile solvent as emulsion concentrate (1). Typical examples of emulsion concentrates (1) and (2) have the following compositions in which all percentages shown are by weight.

|  | Emulsion 1 | Emulsion 2 |
|---|---|---|
| Kraton 102 [1] | 12.2 |  |
| Neville R-16 [2] | 18.3 |  |
| Asphalt, 25 pen |  | 52.50 |
| GN-104 [3] | 18.3 |  |
| Trichlorethylene | 18.3 | 16.875 |
| Xylene | 6.1 | 5.25 |
| Redicote E-1 [4] | 1.9 | 2.00 |
| Redicote 2323 [4] |  | 0.375 |
| Acetic acid (glacial) | 1.0 | 1.0 |
| Water | 23.9 | 22.0 |

[1] Styrene-butadiene block polymer sold by Shell Chemical Company.
[2] Coumarone-indene resin sold by Neville Chemical Company.
[3] Nitrogen bases concentrate, sold by American Gilsonite Co.
[4] Redicote E-1 is a cationic asphalt emulsifying agent and Redicote 2323 is a cationic asphalt adhesion additive, both being sold by Armour Industrial Chemical Company. A typical Redicote material has the formula:

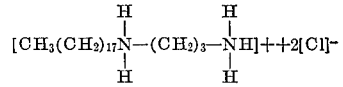

In order to carry out a comprehensive testing program, special equipment was designed to facilitate a large number of tests under a variety of conditions. A small-scale wind machine was constructed which produced wind velocities of up to 230 miles per hour. This type of laboratory wind machine was calibrated against a large wind tunnel. A device was constructed to simulate rainfall on specimens mounted on a rotating table. Several molds were used to form compacted and noncompacted specimens. Penetration time and depth of penetration was measured of a great number of emulsions in various dilutions. Briquettes formed from soils were used in the latter tests. Four soil types ranging from coarse sand to fine-grained clay were used in the evaluation of the effectiveness of the emulsion. Emulsions (1) and (2), as described above, resulted from these tests.

In order to illustrate my invention, there are set forth the following examples in which all parts and percentages are by weight unless otherwise indicated.

EXAMPLES

Example 1.—Manufacture of emulsion concentrate (1)

(1) A mixture of 60.5 lbs. of water, 4.85 lbs. of a cationic emulsifying agent, Redicote E-1, and 2.45 lbs. acetic acid was heated to 170° F. to form a Solution 1.

(2) A mixture of 32 lbs. of a styrene-butadiene block copolymer Kraton 102, 47 lbs. trichlorethylene, 46.5 lbs. of a coumarone-indene type resin, Neville Resin R-16, 15 lbs. xylene, and 46.5 lbs. of nitrogen bases, GN–104, was slowly stirred until a smooth Solution 2 was obtained and then heated to 150° F.

(3) The two solutions, (1) and (2), were then emulsified in a pipeline mixer by first circulating Solution 1 through the mixer then gradually adding Solution 2 to the water phase at the inlet to the mixer. Two tanks, one holding Solution 1, one holding Solution 2, properly connected by piping, were used. After all the ingredients constituting Solutions 1 and 2 were combined the emulsion was refined by one pass through the pipeline mixer into a drum used as shipping container.

Example 2.—Manufacture of emulsion concentrate (2)

The operation as described in Example 1 was carried out using the following ingredients:

Solution 1: | Lbs.
--- | ---
Water | 22.0
Redicode E–1 | 2.0
Acetic acid, glacial | 1.0
Solution 2: |
Asphalt, 25 pen | 52.50
Xylene | 5.25
Trichlorethylene | 16.875
Redicote 2323 | 0.375

Example 3

The emulsion concentrate (1), produced as described in Example 1, was applied to an area adjacent to a helicopter landing area near an asphalt concrete taxiway leading from the helicopter apron to the main taxiway. The site was selected because the strong down-draft from the helicopter rotor blades passing over the area provided excellent test conditions. The emulsion concentrate, produced as described in Example 1, was diluted at the weight ratio of one part emulsion to three parts water and spread on the area at a rate of 0.75 gallon per square yard. A total of 20 gallons was applied over an area of 240 square feet. The soil treated was typical of the desert area in California. Visual observation of the treated area during helicopter traffic showed that the treatment was satisfactory and that the treated area did not develop large amounts of dust under the down-draft of the rotor blades as did areas nearby, which were treated with a commercial product used as a dust palliative.

Example 4

Emulsion concentrates (1) and (2), as described respectively in Examples 1 and 2, and blends of the two made at weight ratios of 1:1, 1:2, 1:3, were diluted with water at a rate of 2 parts of the emulsion or emulsion blend to 1 part of water and then spread on laboratory prototype plots of coarse soil as existing on gravel roads at a rate of 1.5 gallons per square yard. Some of the test plots were pretreated with the emulsions diluted to 20 percent solids at a rate of 0.5 gallon per square yard. The appearance of the treated areas corresponded to the total amount of treatment similar to roads paved with various amounts of asphalt.

Testing of the treated surfaces by exposing them to simulated rain and wind revealed a high degree of bonding of the aggregate and a flexibility of the surface far superior to ordinary surfaces treated with asphalt cutbacks or asphalt emulsions. The degree of flexibility corresponded to the amount of emulsion concentrate (1) present in the products applied.

As shown in the foregoing examples, my invention provides a means for consolidating soils by applying either emulsion concentrates (1) or (2) to the soils, either individually or in conjunction with each other. Emulsion concentrate (1), as described, contains a thermoplastic stryene-butadiene block copolymer, e.g., the polymer Kraton 102, sold by Shell Chemical Co., which is soluble in trichlorethylene at ambient temperatures, and gives films cast from trichlorethylene solution which have a modulus at 300% of about 200 p.s.i. or higher as determined by ASTM method D–412. The styrene-butadiene block copolymer is present in an amount sufficient to give a viscosity of about 800 to about 1,000 centipoises at a concentration of about 15% by weight in trichlorethylene. Emulsion concentrate (1) also contains a resin, such as coumarone-indene resin, which is combatible, e.g., miscible but relatively non-reactive, with the styrene-butadiene block copolymer and has a melting point in the order of 140° to 300° F. and acts as a stiffening resin. In addition, emulsion concentrate (1) contains a polar unsaturated resinous oil, such as nitrogen bases derived from gilsonite, which is relatively non-volatile; an chlorinated hydrocarbon which is relatively volatile at ambient conditions, such as trichlorethylene, and a volatile aromatic type of solvent such as xylene, toluene, benzene or coal tar naphthas containing these chemicals. The chlorinated hydrocarbon is employed in an amount sufficient to maintain the flash point above about 80° F. and the amount of volatile aromatic solvent employed is sufficient to maintain the specific gravity of the emulsion base employed in forming emulsion concentrate (1) in the order of 1.0, e.g., 0.946 to 1.068. The emulsion base used for forming emulsion concentrate (1) includes all of the ingredients in the emulsion concentrate except for the water and cationic surfactant. The emulsion concentrate (1) contains from about 2 to 7 parts by weight of water and about 3 to 8 parts by weight of the dispersed phase. The emulsion base is emulsified in water with the aid of a cationic surfactant up to about 3% by weight of the emulsion concentrate in the manner described in Example 1. The weight ratio of block copolymer:coumarone-indene resin:polar unsaturated resinous oil can be varied as for example 1:1: to 1:2:2 in practicing my invention. Tests showed that at least 40 percent of the solvent system, excluding water, should consist of the polar unsaturated resinous oil in order to obtain good penetration into clay soils.

The polar unsaturated resinous oil, if a nitrogen bases concentrate derived from gilsonite, may have the following typical properties which are the properties of GN–104 sold by American Gilsonite Company:

Initial boiling point at 760 mm. Hg—226° F.
Chemical composition (ASTM Method D–2006):
    A—2.3%
    N—91.1%
    $A_1$—4.2%
    $A_2+P$—2.4%

Thermoplastic block copolymers (as employed in emulsion concentrate (1) above, are relatively new synthetic elastomers consisting of copolymerization products of the same monomers which are used in the production of the multitude of synthetic rubbers available in the market.

In contrast to the block copolymers, most synthetic rubbers require vulcanization to develop the strength, elasticity, and limited solubility desired in useful rubber goods.

The properties of a given elastomer are governed not only by the type of monomers used in its formation but also by the structural configurations of the monomeric segments. In homopolymers, such as poly(isoprene) and poly(butadiene), the various possible configurations are determined by the steric arrangement of the double bonds. Three configurations are possible: namely, cis, trans, and random.

All homopolymers consist of chains of the same monomeric units. Typical homopolymers are poly(isoprene), poly(butadiene), poly(chloroprene), and poly(styrene). The strength of homopolymers is mainly governed by the molecular weight of the polymer, and their elasticity is governed by the type of monomer and its steric configuration. Cis polymers have high elasticity, trans polymers have little elasticity, and random polymers have an intermediate amount of elasticity. Monomers which contain aromatic rings, such as styrene, give rigid polymers which are plastics rather than elastomers.

The effect of the monomeric unit on the properties of the polymer is more complex in the case of copolymers which contain differing types of monomeric units. Monomeric units such as isoprene, butadiene, acrylonitrile, chloroprene, etc., provide elasticity, while monomeric units such as styrene, which contain a ring structure, contribute to the rigidity of the copolymers. The principal differences between copolymers are determined by the sequence of the monomers in the polymer structure when two given monomers, e.g., styrene (s) and butadiene (b) are copolymerized. The sequential arrangement is usually random, as depicted by s—b—s—b—b—s—s—b, with the ratio of s to b depending primarily on the percentage of each monomer which is used. This is explainable by the fact that the polymerization product is the result of 1,4 addition to the conjugated double bonds of the monomers with little preference being shown for addition between particular monomers. The 1,4 addition in the case of butadiene-styrene copolymers can be depicted by the following rearrangement of bonds:

$H_2C=CH-CH=CH_2 \longrightarrow -CH_2-CH=CH-CH_2-$

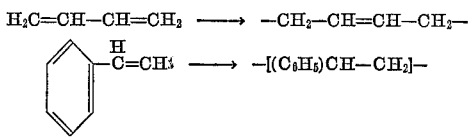

The 1,4 addition can take place between any two monomer units in any sequence and is usually random addition if the two monomers are charged simultaneously to the polymerization reactor.

Block copolymers, as employed in emulsion concentrate (1), are the result of copolymerization of blocks of monomers which are produced in an initial step of homopolymerization. Thus, when the homopolymer poly(butadiene) has the configuration $(b-b-b-b)_n=B$ and poly(styrene) has the configuration $(s-s-s-s-s)_n=S$, block copolymers of these homopolymers have the configuration S—B—S or B—S—B or

Thermoplastic block copolymers, as employed in emulsion concentrate (1), are those of the S—B—S or

type in which the end blocks are the rigid plastic blocks S and the inner block is the elastic chain-like block B.

Since no claim is made to the polymers per se, and since they have been described in the prior art, it will be sufficient to refer to the following U.S. patents: 3,239,478; 3,242,038, 3,231,635, and 3,265,765. For discussions of the block copolymers, their chemical constitution and the molecular weight of the constituent blocks, see particularly U.S. Pats. 3,231,635 and 3,265,765.

The polystyrene-polybutadiene block copolymers have been described in the above patents as having the following characteristics, to wit: conjugated diene blocks of molecular weight between 2,000 and 1,000,000 and the end blocks of about 2,000 to 100,000 molecular weight. For the purpose of making solutions of high solids content, I prefer to use polymers of relatively low molecular weight, i.e., in the range of 40,000 to 100,000.

The emulsion concentrate (2), which may be employed alone or in conjunction with my resinous emulsion concentrate (1), contains a low penetration asphalt, e.g., 10–30 pen., a small amount, e.g., up to 3%, of a cationic surfactant, and a solvent system including the volatile solvents employed in my resinous emulsion concentrate (1).

The asphalt in emulsion concentrate (2) comprises about 40 to 60 parts; the total quantity of volatile aromatic hydrocarbon and chlorinated hydrocarbon comprise about 15 to 40 parts, and the ratio of non-aqueous phase to water phase is about 4:1 to 1:3. The specific gravity of emulsion concentrate (2) is about that of water, and the amount of the chlorinated hydrocarbon solvent, e.g., trichlorethylene, is sufficient to raise the flash point above about 80° F.

Either emulsion concentrate (1) or (2) may be acidified to a pH of about 4.5 to 6.5 through addition of an acid such as acetic or propionic acid.

In applying my resinous emulsion concentrate (1), I have used various dilution ratios with water, e.g., 3:1 to 1:7, and various application rates, viz, 0.50 to 1.7 gallons of diluted emulsion per square yard of soil. My emulsion concentrate (2) can be applied to soils in like dilutions with water. The application rate of the diluted emulsion can, if desired, be higher than 2.0 gallons per square yard, as in treating soils containing a high gravel content.

I claim:
1. An emulsion base which on emulsification with water produces an emulsion concentrate that is suitable for application to soils to increase their bearing strength and resistance to erosion, said emulsion comprising:

a thermoplastic styrene-butadiene block copolymer having the formula S—B—S or

wherein S is a polystyrene block and B is a polybutadiene block, said block copolymer being highly soluble in trichlorethylene at room temperature and providing a viscosity of about 800 to 1,000 centipoises at a polymer concentration of 15% by weight in trichlorethylene, said copolymer giving films cast from solution having a modulus at 300% of 200 p.s.i. or higher;

a thermoplastic amorphous coumarone-indene resin having a softening point of 140–300° F. which is compatible with said block copolymer;

a high nitrogen base polar solvent which is nonvolatile under atmospheric conditions and is an unsaturated resinous oil;

trichlorethylene in an amount sufficient to provide a flash point above about 80° F.;

a non-polar aromatic hydrocarbon solvent which is volatile under atmospheric conditions;

the weight ratio of block copolymer to coumarone-indene resin to polar nonvolatile solvent ranging from about 1:1:1 to 1:2:2, the nonvolatile polar solvent comprising at least 40% of the solvent system, and said emulsion base having a specific gravity of about 1.0.

2. The emulsion base of claim 1 wherein said high nitrogen base polar solvent comprises bases derived from gilsonite.

3. The emulsion base of claim 1 wherein said non-polar aromatic solvent is xylene.

4. An emulsion concentrate comprising about 2 to 7 parts of water, about 3 to 8 parts of the emulsion base of claim 1 as the disperse phase, and a cationic surfactant in an effective amount up to about 3% by weight of said concentrate.

References Cited

UNITED STATES PATENTS

| | | | |
|---|---|---|---|
| 2,733,227 | 1/1956 | McKay | 260—829 |
| 3,015,638 | 1/1962 | Sergi | 260—829 |
| 3,265,765 | 8/1966 | Holden | 260—28.5 |
| 3,378,512 | 4/1968 | Hamad | 260—33.8 |
| 3,449,306 | 6/1969 | Zelinski | 260—829 |

MORRIS LIEBMAN, Primary Examiner

P. R. MICHL, Assistant Examiner

U.S. Cl. X.R.

94—25; 106—277, 278; 260—32.4, 33.6, 33.8, 829